(12) United States Patent
Habel et al.

(10) Patent No.: US 8,555,503 B2
(45) Date of Patent: Oct. 15, 2013

(54) CASTING-INTEGRATED CONTROL BODY PROCESSING

(75) Inventors: Michael J. Habel, Ann Arbor, MI (US); Derek Kinch, Ypsilanti, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 13/186,761

(22) Filed: Jul. 20, 2011

(65) Prior Publication Data
US 2013/0019479 A1    Jan. 24, 2013

(51) Int. Cl.
*B21K 1/24*    (2006.01)
*B23D 21/14*   (2006.01)

(52) U.S. Cl.
USPC ............. 29/890.132; 29/890.12; 29/890.122; 29/890.128; 83/191; 83/678; 83/876; 408/1 R

(58) Field of Classification Search
USPC ......... 29/890.12, 890.122, 890.126, 890.128, 29/890.132; 408/1, 1 R; 409/131, 143, 409/217; 251/25, 129.15; 83/191, 491, 678, 83/858, 876

See application file for complete search history.

(56) References Cited

U.S. PATENT DOCUMENTS

| | | | | |
|---|---|---|---|---|
| 2,985,566 | A | * | 5/1961 | Tsien et al. .................. 205/149 |
| 3,163,175 | A | * | 12/1964 | Pearson .................. 137/315.09 |
| 4,106,880 | A | * | 8/1978 | Anders ......................... 408/1 R |

* cited by examiner

*Primary Examiner* — Alexander P Taousakis
(74) *Attorney, Agent, or Firm* — David B. Kelley; MacMillan, Sobanski & Todd, LLC

(57) ABSTRACT

A method for forming a valve includes forming a valve body; machining a bore by passing a tool having cutting edges along an axis into the valve body; machining a groove and face in the bore at axially spaced locations by revolving the tool about a circular circumference whose center is aligned with the bore; and supplying lubricant in a pneumatic stream through the tool to the cutting edges.

18 Claims, 3 Drawing Sheets

CASTING-INTEGRATED CONTROL BODY PROCESSING

BACKGROUND OF THE INVENTION

1. Field of the Invention

This invention relates generally to a method for fabricating a regulator valve controlled by a direct acting solenoid located in a machined main control casting for an automatic transmission.

2. Description of the Prior Art

An automatic transmission includes a hydraulic system for regulating fluid pressure and hydraulic fluid flow in various lines connected to components of the transmission. The system includes a regulator spool valve packaged in a main control casting, which is machined at a transmission production plant. The casting, preferably of an aluminum alloy, is usually referred to as a valve body. The components of the system are assembled in the valve body.

A solenoid-actuated shift valve controls pressure communicated from the valve to a clutch or brake whose state of engagement and disengagement determines the gear in which the transmission operates. But the dimensional tolerance stack-up in most valve body castings is too large to permit use of a practical integrated electromagnet and achieve required flow and pressure regulation accuracy.

Transmissions with direct acting solenoids require a method to provide hydraulic pressure to clutches and brakes for high torque operating conditions such that the pressure can be delivered independently of the control pressure range suitable for shift control.

A need exists in the industry for a method for machining a valve in a valve body, such that the dimensions of certain features of the valve and the related tolerances are ultra-precise. Preferably the critical features, such as a groove and a face surface, are machined concurrently in a single operation with processing equipment that employs a minimum quantity lubrication machining process.

SUMMARY OF THE INVENTION

A method for forming a valve includes forming a valve body, machining a bore by passing a tool having cutting edges along an axis into the valve body, machining a groove and face in the bore at axially spaced locations by revolving the tool about a circular circumference whose center is aligned with the bore, and supplying lubricant in a pneumatic stream through the tool to the cutting edges.

The method machines several critical functional features simultaneously using a circular interpolation machining process.

All edges that requiring precise relative positions are cut in a single operation for improved tolerances and manufacturing efficiency. The metering edges 48, 49 are precision machined rather than cast for improved edge quality, location accuracy, and zero draft. High precision tolerances enable close control of hydraulic fluid leakage and pressure regulation accuracy.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
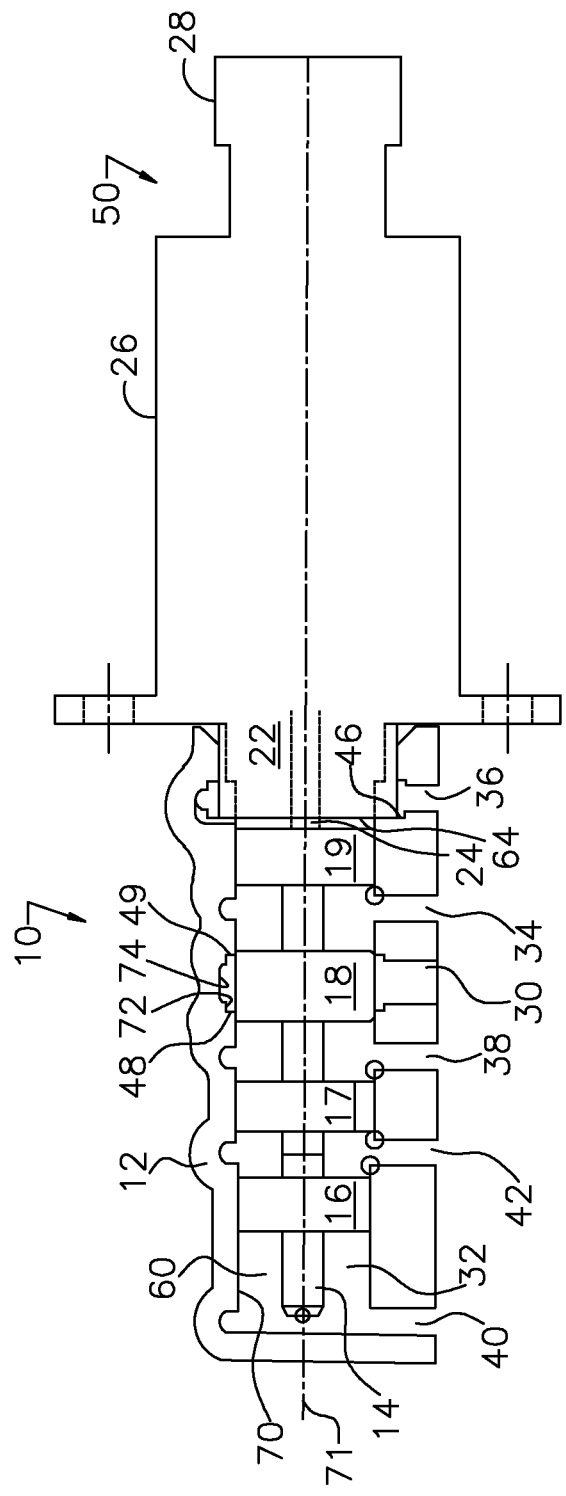
FIG. 1 is a cross section through a diametric plane of a casting-integrated direct acting solenoid valve formed in a valve body.

The casting-integrated, direct acting solenoid hydraulic valve 10 shown in FIG. 1 is formed in a valve body 12 formed of cast metal, preferably an aluminum alloy. The valve 10 includes a valve spool 14, formed with lands 16-19; an adapter 22; an armature pin 24 extending through the adapter and contacting the spool 14; an electromagnetic solenoid 26, which actuates the pin 24 to move leftward when the solenoid is energized and allows the spool to be axially displaced when the solenoid is deenergized.

The valve body 12 is formed with control ports 30, 42 through which control pressure communicates with the chamber 32 containing the spool 14; a line pressure port 34, through which line pressure communicates with the chamber; sump port 36, through which hydraulic fluid flows from the chamber to a low pressure sump; and an exhaust ports 38, 40, through which the chamber 32 communicates with a low pressure source.

Adapter 22 is continually held in contact with an installation datum, i.e., a reference face surface 46 formed in sump port 36. An elastic force produced by a resilient clip, secured to the outer surface of a housing that encloses the solenoid 26, maintains adapter 22 in contact with the face surface 46 and establishes the correct axial position of the solenoid module 50. The solenoid module 50 includes adapter 22, solenoid 26, housing 45 and spring 28.

FIG. 1 shows that the diameters of control lands 17, 18, 19 are substantially identical yet larger than the diameter of land 16. The lands 16-19 are machined in the bore 70. The diameter of land 16 defines a large diameter spool end damper 60 for enhancing stability, permitting use of a relatively large diameter, contamination resistant damper port. Damper 60 is formed outside of the feedback path 64 for minimum feedback lag and improved stability. The diameter of damper 60 is large relative to the difference in diameter of the lands 16 and 17.

The axial surface 64 of adapter 22 is located in chamber 32 due to contact with reference face surface 46 such that, when solenoid 26 is deenergized and spool 14 moves rightward in the chamber, land 19 contacts surface 64 before the armature pin 24 contacts a stop surface in the solenoid module. In this way, the spool end feature provides positive stop for forced over travel protection of the solenoid module 50.

Figure 2:
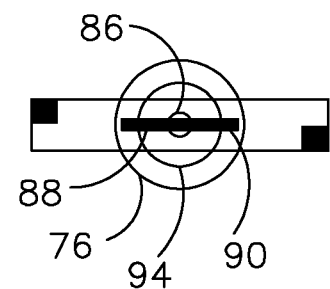
FIG. 2 are schematic top and end views of a tool for machining valve of FIG. 1.
Figure 2:
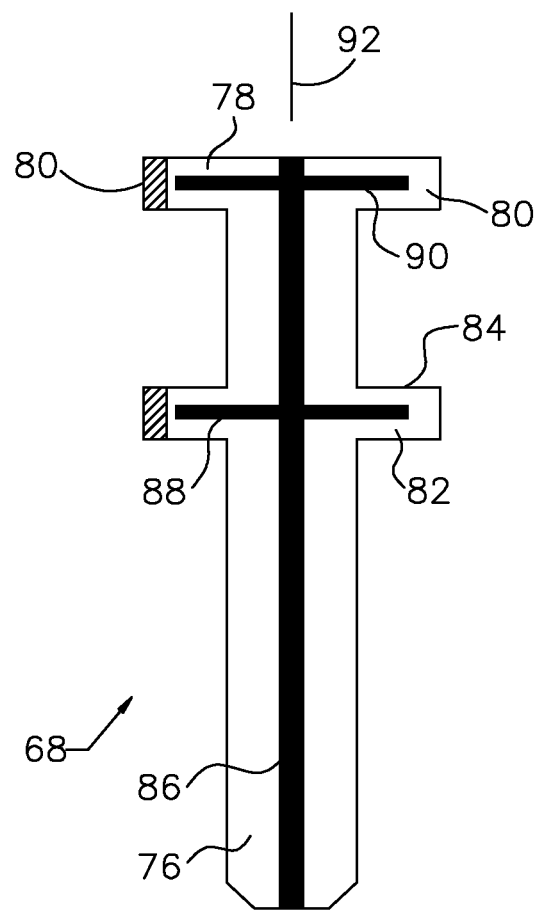
Figure 3:
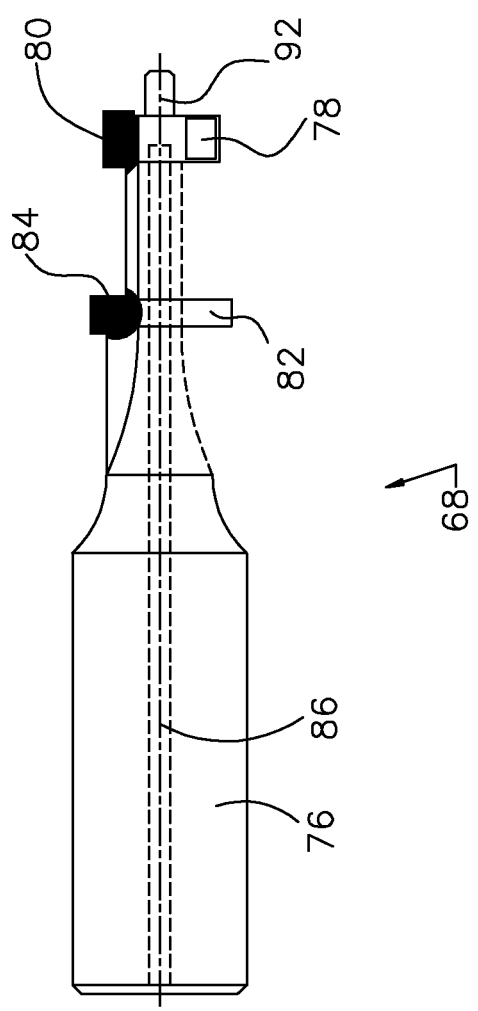
FIG. 3 is top view of the tool of FIG. 2.

A single cutting tool 68, shown in FIGS. 2 and 3, machines in the valve body 12 a groove 72 in bore 70, which is concentric with the axis of bore 70. Tool 68 concurrently machines in the valve body 12 (i) both of the metering edges 48, 49 at control port 30, (ii) the radial groove 72 that connects edges 48, 49, and (iii) the installation datum or reference face surface 46 at sump port 36. Surfaces 74 are located at the radial outer side of the groove base 72

All edges that requiring precise relative positions are cut in a single operation for improved tolerances and manufacturing efficiency. The metering edges 48, 49 are precision machined rather than cast for improved edge quality, location accuracy, and zero draft. High precision tolerances enable close control of hydraulic fluid leakage and pressure regulation accuracy. Close tolerances enable flow control with a short stroke magnetic section 50.

The cutting tool 68 is formed with a precision axially-directed shank 76. A first supported cutting edge 78 extends radially from shank 76 and includes a cutting edge 80 for forming the groove 72 in valve body 12, the groove being defined by the inner metering edge 48 and outer metering edge 49 at control port 30. A second supported cutting edge 82 spaced axially from supported cutting edge 78 and extending radially from shank 76 includes a cutting edge 84 for forming the reference face surface 46 formed at sump port 34.

All diameters and chamfers of the precision bore and other features of valve 10 are semi-finished with an existing standard cutting tool before using cutting tool 68, or can be finished after the completed bore 70 has been finished machined.

The radial ports 30, 34, 36, 38, 40 and 42 are subsequently formed with another cutting tool.

Cutting tool 68 functions with lubricant carried in an axial passage 86 along the shank 76 and in radial passages 88, 90 along the supported cutting edges 78, 82 to the cutting edges 80, 84, A pneumatic stream, preferably compressed air, carries the lubricant through the passages 86, 88, 90 to the cutting edges 80, 84 at a preferred flow rate in the range 10-200 ml per hour. The passages 88, 90 shall be sized to achieve steady and equal amounts of flow from each outlet location.

Preferably the lubricant is CareCut™ ES 1 NA, a chlorine and heavy metal-free neat cutting oil commercially available from Castrol.

After the bore 70 is semi-finished or finished machined, the radial groove 72 that establishes edges 48, 49 and the installation datum or reference face surface 46 are machined in the bore by revolving the axis 92 of cutting tool 68 along a circular circumference 94, whose center is aligned with the axis of bore 70 and whose radius is substantially equal to the radial distance between the radius of metering edges 48, 48 and the outer radius of supported cutting edge 80.

In a previous or subsequent processing step the precision diameters and surfaces of the control body casting are finish machined using industry standard reamers.

In accordance with the provisions of the patent statutes, the preferred embodiment has been described. However, it should be noted that the alternate embodiments can be practiced otherwise than as specifically illustrated and described.

The invention claimed is:

1. A method for forming a valve, comprising:
   (a) casting a valve body;
   (b) machining a bore along an axis in the valve body using a first tool;
   (c) machining in the bore a groove and axially spaced edges by revolving the a second tool having cutting edges about a circular circumference whose center is aligned with the bore;
   (d) supplying lubricant in a pneumatic stream through the tool to the cutting edges.

2. The method of claim 1 wherein step (a) further comprises forming the valve body of cast metal.

3. The method of claim 1 wherein step (b) further comprises: before machining the groove and face in the valve body using the second tool, using a second cutting tool to semi-finish surfaces of the bore.

4. The method of claim 1 wherein step (b) further comprises: after machining the groove and face in the valve body using the second tool, finish machining the valve using reamers.

5. The method of claim 1 wherein step (c) further comprises:
   while the second tool is rotating, revolving the second tool about a circular circumference whose center is aligned with the bore and whose radius is substantially equal to a radial distance between a radius of groove and an outer radius of the cutting edge of the second tool that machines the groove.

6. The method of claim 1 wherein step (d) further comprises: supplying lubricant in a pressurized air stream through passages in the second tool that carry lubricant in the air stream to the cutting edges of the second tool.

7. A method for forming a valve, comprising:
   (a) casting a valve body;
   (b) machining in the valve body a bore having a constant first diameter using a first tool;
   (c) machining a groove in the bore, the groove having a second diameter larger than the first diameter by revolving a second tool having cutting edges about a circumference whose center is aligned with the bore;
   (d) supplying lubricant in a pneumatic stream through the second tool to the cutting edges.

8. The method of claim 7 wherein step (a) further comprises forming the valve body of cast metal.

9. The method of claim 7 wherein step (b) further comprises: before machining the groove and face in the valve body using the second tool, using a second cutting tool to semi-finish surfaces of the bore.

10. The method of claim 7 wherein step (b) further comprises: after machining the groove and face in the valve body using the second tool, finish machining the valve using reamers.

11. The method of claim 7 wherein step (c) further comprises:
    while the second tool is rotating, revolving the second tool about a circular circumference whose center is aligned with the bore and whose radius is substantially equal to a radial distance between a radius of the groove and an outer radius of the cutting edge of the second tool that machines the groove.

12. The method of claim 7 wherein step (d) further comprises: supplying lubricant in a pressurized air stream through passages in the second tool that carry lubricant in the air stream to the cutting edges of the second tool.

13. A method for forming a valve, comprising:
    (a) casting a valve body;
    (b) machining in the valve body a bore having a constant first diameter using a first tool;
    (c) machining a face surface and a groove in the bore, the groove having a diameter larger than the first diameter, by revolving a second tool having cutting edges about a circumference whose center is aligned with the bore;
    (d) supplying lubricant in a pneumatic stream through the second tool to the cutting edges.

14. The method of claim 13 wherein step (a) further comprises forming the valve body of cast metal.

15. The method of claim 13 wherein step (b) further comprises: before machining the groove and face in the valve body using the second tool, using a second cutting tool to semi-finish surfaces of the bore.

16. The method of claim 13 wherein step (b) further comprises:

after machining the groove and face in the valve body using the second tool, using a third cutting tool to machine radial ports in the valve body.

17. The method of claim 13 wherein step (b) further comprises: after machining the groove and face in the valve body using the second tool, finish machining the valve using reamers.

18. The method of claim 13 wherein step (c) further comprises:
while the second tool is rotating, revolving the second tool about a circular circumference whose center is aligned with the bore and whose radius is substantially equal to a radial distance between a radius of the groove and an outer radius of the cutting edge of the second tool that machines the groove.

* * * * *